United States Patent [19]
Brothers et al.

[11] Patent Number: 5,919,878
[45] Date of Patent: Jul. 6, 1999

[54] AMORPHOUS FLUOROPOLYMER CONTAINING PERFLUORO(ETHYL VINYL ETHER)

[75] Inventors: Paul Douglas Brothers, Chadds Ford, Pa.; Richard Alan Morgan, Vienna, W. Va.

[73] Assignee: E. I. du Pont de Nemours and Company, Wilmington, Del.

[21] Appl. No.: 08/929,213

[22] Filed: Sep. 9, 1997

Related U.S. Application Data

[60] Provisional application No. 60/026,397, Sep. 13, 1996.
[51] Int. Cl.⁶ ..................................................... C08F 214/26
[52] U.S. Cl. ............................ 526/247; 526/245; 526/246; 526/249; 526/255; 428/457; 428/421; 428/422; 524/462; 524/544; 525/276
[58] Field of Search ....................................... 526/247, 245, 526/246, 249, 255; 428/457, 421, 422; 524/544, 462; 525/276

[56] References Cited

U.S. PATENT DOCUMENTS

| | | | |
|---|---|---|---|
| 3,635,926 | 1/1972 | Gresham et al. | |
| 4,138,426 | 2/1979 | England | |
| 4,982,009 | 1/1991 | Hung | 568/615 |
| 5,059,720 | 10/1991 | Hung | 568/674 |
| 5,266,639 | 11/1993 | Chapman et al. | 525/200 |
| 5,310,838 | 5/1994 | Hung et al. | 526/245 |
| 5,328,946 | 7/1994 | Tuminello et al. | 524/462 |
| 5,397,829 | 3/1995 | Morgan et al. | 524/463 |
| 5,461,129 | 10/1995 | Kurihara et al. | 526/247 |
| 5,543,217 | 8/1996 | Morgan | 428/375 |

FOREIGN PATENT DOCUMENTS

| | | |
|---|---|---|
| 4-88304 | 3/1992 | Japan . |
| WO96/24625 | 8/1996 | WIPO . |

*Primary Examiner*—Mark L. Warzel

[57] ABSTRACT

Amorphous fluoropolymers contain tetrafluoroethylene and perfluoro(ethyl vinyl ether).

14 Claims, No Drawings

AMORPHOUS FLUOROPOLYMER CONTAINING PERFLUORO(ETHYL VINYL ETHER)

RELATED APPLICATIONS

This application claims the benefit of priority of Provisional application Ser. No. 60/026,397 filed Sep. 13, 1996.

FIELD OF THE INVENTION

This invention is in the field of amorphous fluoropolymers.

BACKGROUND OF THE INVENTION

Copolymers of tetrafluoroethylene and perfluoro(ethyl vinyl ether) disclosed heretofore have been crystalline copolymers. See, for example, U.S. Pat. Nos. 3,635,926 and 5,461,129.

SUMMARY OF THE INVENTION

This invention provides an amorphous fluoropolymer, comprising copolymerized units of tetrafluoroethylene and perfluoro(ethyl vinyl ether).

In one embodiment of the invention, the amorphous fluoropolymer includes units of one or more additional fluorinated monomers. Preferred additional monomers include perfluoro(methyl vinyl ether). When perfluoro (methyl vinyl ether) is present in the fluoropolymer, perfluoro(ethyl vinyl ether) is at least 15% of the combined weight of perfluoro(ethyl vinyl ether) and perfluoro(methyl vinyl ether).

In a further embodiment, the invention provides amorphous fluoropolymers containing units of functional fluorinated monomer.

The invention also provides coated articles, wherein the coating comprises the amorphous copolymer of the invention.

DETAILED DESCRIPTION

Fluoropolymers of this invention are copolymers that contain at least tetrafluoroethylene (TFE) and perfluoro (ethyl vinyl ether) (PEVE), and can contain additional fluorinated comonomers. The amount of PEVE and other comonomer, together, incorporated in the polymer is such that the fluoropolymer is amorphous. By this it is meant that the heat of fusion calculated from any endotherm detected in a differential scanning calorimetry (DSC) scan for as-polymerized resin is no more than about 3 J/g, preferably no more than about 1 J/g. Generally, no endotherm is seen in a second DSC heating even if a weak endotherm is detected for first heating.

For TFE/PEVE dipolymer, the threshold (minimum) amount of incorporated PEVE effective to make the polymer amorphous is in excess of about 20 wt % based on total weight of polymer. Generally, at least 30 wt % of PEVE will be present in amorphous TFE/PEVE dipolymer. Larger amounts of PEVE, of course, yield amorphous polymers, also.

The amorphous fluoropolymers of this invention can contain units derived from one or more fluorinated monomers other than TFE and PEVE. Such other monomers can be non-functional or can be functional. Non-functional monomers result in incorporated units in the polymer that are generally inert, whereas functional monomers are monomers that introduce into the fluoropolymer pendant side groups containing functional units capable of altering surface characteristics, promoting adhesive bonds, serving as crosslinking sites, and the like. Usually, but not necessarily, such functional units are at the ends of the pendant side groups. Examples of such functionality include ester, alcohol, acid (including carbon-, sulfur-, and phosphorus-based acid) and salt and halide thereof. Other functionalities include cyanate, carbamate, nitrile and the like.

Non-functional fluorinated monomers that can be used in the amorphous fluoropolymers of this invention include fluoroolefins (other than TFE) having 2–8 carbon atoms and fluorinated alkyl vinyl ethers in which the alkyl group contains 1 or 3–5 carbon atoms. While hydrogen-containing monomers, e.g., perfluorobutyl ethylene, can be used, such non-functional monomers are preferably perhalogenated. Preferred fluoroolefins include hexafluoropropylene (HFP) and chlorotrifluoroethylene (CTFE). When HFP is present, the glass transition temperature of the TFE/PEVE copolymer is preferably less than 20° C. Preferred vinyl ethers include the perfluoro(alkyl vinyl ethers) other than PEVE, especially perfluoro(methyl vinyl ether) (PMVE) and perfluoro(propyl vinyl ether) (PPVE), most especially PMVE.

A wide variety of functional fluorinated monomers can be used in the amorphous fluoropolymers of this invention. Such monomers include but are not limited to fluorovinyl ethers, such as those having the general formula $CF_2=CF-R_f-X$, wherein $R_f$ is linear or branched perfluoroalkoxy having 2–20 carbon atoms and X is a functional group that may contain $CH_2$ groups. Examples of such fluorovinylethers include the hydroxy compounds disclosed in U.S. Pat. No. 4,982,009; the alcoholic esters disclosed in U.S. Pat. No. 5,310,838; and the carboxyls and carboxylic esters disclosed in U.S. Pat. No. 4,138,426. Preferred such fluorovinylethers include $CF_2=CF-O-CF_2CF_2-SO_2F$; $CF_2=CF[OCF_2CF(CF_3)]O(CF_2)_2-Y$ wherein $-Y$ is $-SO_2F$, $-CN$, or $-COOH$; and $CF_2=CF[OCF_2CF(CF_3)]O(CF_2)_2-CH_2-Z$ wherein $-Z$ is $-OH$, $-OCN$, $-O-(CO)-NH_2$ or $-OP(O)(OH)_2$.

Compounds having the formula $CF_2=CF-R_f-(CH_2)_n-X$ in which X is $-OCN$ (cyanate), $-O-(CO)-NH_2$ (carbamate), or $-OP(O)(OH)_2$ (phosphono) can be synthesized as follows. The cyanate can be prepared in high yield by a one-step process in which compounds having the general formula $CF_2=CF-R_f-(CH_2)_n-OH$ (I), wherein n is 1–3, are reacted with cyanogen bromide (CNBr) or cyanogen chloride (CNCl) in the presence of non-nucleophilic base. The carbamate can be prepared from the cyanate by contacting cyanate with acid at elevated temperature for time sufficient to complete conversion of cyanate to carbamate. The phosphorus-containing compounds can be prepared in high yield by a process in which compounds (I) are reacted with $P(O)Cl_3$ or $P(O)Br_3$, either neat or in aprotic solvent, to obtain the chloride or bromide, e.g., $CF_2=CF-R_f-(CH_2)_n-OP(O)(Cl_2)$, followed by hydrolysis to obtain the acid $-OP(O)-(OH)_2$.

The amount of other fluorinated monomer, if any, used in the amorphous fluoropolymers of this invention can vary, depending on the other monomer and the result to be achieved. When other fluorinated monomer is non-functional, its concentration in the copolymer can be less than or greater than the PEVE concentration, depending on the non-functional monomer and the result desired. In general, the non-functional other monomer will be in minor amount relative to the amount of PEVE in the copolymer. For example, the amount of HFP or of PPVE will generally be less than 10 wt %, usually less than 5 wt %, based on total copolymer. If the non-functional other monomer is PMVE, in particular, it can be present in minor amount relative to PEVE, or the amount of PMVE can be comparable to or even exceed the amount of PEVE. However, the amount of PEVE is at least 15% of the combined weight of PEVE and PMVE, preferably at least 20%, and most preferably at least 25%. Thus, the weight ratio PEVE:PMVE in the amorphous fluoropolymer of this invention is in the range 100:0 to 15:85, preferably 100:0 to 20:85, most preferably 100:0 to 25:75. While amorphous polymers having very large proportions of incorporated PEVE, or PEVE plus PMVE, can be made, e.g., 95 wt %, the amount of TFE present in the polymer will generally be at least 20 wt %, more commonly at least 40 wt %, based on total weight of polymer.

When other fluorinated monomer is functional, its concentration in the copolymer will generally be less than the PEVE concentration, depending on the functional monomer and the result desired. Usually, the amount of a functional other monomer will be less than 5 wt %, often less than 3 wt %, based on total copolymer.

The TFE/PEVE copolymers of this invention can be made by aqueous dispersion polymerization, optionally with solvent present, but preferably in the absence of non-aqueous solvent. Other methods that yield copolymer having generally homogeneous composition can be used.

For aqueous dispersion polymerization, a broad range of temperatures can be used. Because of heat transfer considerations and the use of thermally activated initiators, higher temperatures are advantageous, such as temperatures in the range of about 50°–110° C. Temperature in the range 70°–90° C. is preferred for making the copolymers of this invention by the aqueous semibatch process used in the examples below. Surfactants used in emulsion polymerization appear to be less effective at temperatures above 103° C.–108° C. and there is a tendency to lose dispersion stability.

Surfactants generally suitable for use in dispersion polymerization of TFE copolymers can be used. Such surfactants include, for example, ammonium perfluorooctanoate (C-8), ammonium perfluorononanoate (C-9), and the perfluoroalkyl ethane sulfonic acids and salts thereof disclosed in U.S. Pat. No. 4,380,618.

Initiators commonly employed in emulsion polymerization of TFE copolymers are water-soluble free-radical initiators such as ammonium persulfate (APS), potassium persulfate (KPS), or disuccinic acid peroxide, or redox systems such as those based on potassium permanganate. Such initiators can be used in aqueous processes to make the TFE/PEVE copolymers of this invention. APS and/or KPS is preferred.

Chain transfer agent (CTA) can be used in aqueous polymerization of the TFE/PEVE copolymers of this invention. A wide range of compounds can be used as CTA. Such compounds include, for example, hydrogen-containing compounds such as molecular hydrogen, the lower alkanes, and lower alkanes substituted with halogen atoms. The chain transfer activity of such compounds when used in TFE/PEVE polymerization can result in copolymer having $-CF_2H$ end groups which are relatively stable. The CTA can contribute other relatively stable end groups, depending on the identity of the CTA. Preferred CTAs include methane, ethane, and substituted hydrocarbons such as methyl chloride, methylene chloride, chloroform, and carbon tetrachloride. The amount of CTA used to achieve desired molecular weight will depend, for given polymerization conditions, on the amount of initiator used and on the chain transfer efficiency of the chosen CTA. Chain transfer efficiency can vary substantially from compound to compound, and varies with temperature.

The formation of —COOH end groups can be offset by buffering the polymerization with alkaline buffering agent such as ammonium carbonate or ammonia (ammonium hydroxide) to provide more stable end groups, as disclosed by Gresham & Vogelpohl in U.S. Pat. No. 3,635,926.

After the reactor is charged with water, surfactant, CTA (if used) and monomers, heated to the chosen temperature and agitation started, a solution of initiator is added at a prescribed rate to initiate polymerization. A pressure drop is the usual indicator that polymerization has started. Then, TFE addition is started and controlled according to the scheme chosen to regulate the polymerization. An initiator solution, which can be the same as or different from the first initiator solution, is usually added throughout the reaction.

There are several alternatives for regulating the rate of polymerizing the TFE/PEVE copolymers of this invention. It is common with most alternatives first to precharge at least part of the PEVE monomer and then to add TFE to the desired total pressure. Additional TFE is then added after initiator injection and reaction kickoff to maintain the chosen pressure, and additional PEVE may be added, also. The TFE may be added at a constant rate, with agitator speed changed as necessary to increase or decrease actual polymerization rate and thus to maintain constant total pressure. In a variant of this alternative, pressure may be varied to maintain constant reaction rate at constant TFE feed rate and constant agitator speed. Alternatively, the total pressure and the agitator speed may both be held constant, with TFE added as necessary to maintain the constant pressure. A third alternative is to carry out the polymerization in stages with variable agitator speed, but with steadily increasing TFE feed rates. When PEVE is added during the reaction, it is convenient to inject it at a fixed rate. Preferably, the rate of PEVE addition is uniform during a given phase of polymerization. However, one skilled in the art will appreciate that a wide variety of PEVE monomer addition programs can be employed. Thus, for example, PEVE can be added as a mixture with TFE, or a series of discrete PEVE additions can be used. Such discrete additions can be in equal or varying amounts, and at equal or varying intervals. Other non-uniform PEVE addition programs can be used.

When fluorinated monomers other than TFE and PEVE are used, each other monomer can independently be introduced as described for PEVE, depending on the reactivity of the of the other monomer, the amount to be incorporated into the copolymer, and the result desired. Thus, each other monomer can be precharged and/or added during polymerization, including addition in mixture with PEVE and/or TFE.

Any workable pressure can be used in aqueous processes to make the TFE/PEVE copolymers of this invention. High pressure offers an advantage over low pressure in increased reaction rate. However, the polymerization of TFE is highly exothermic, so high reaction rate increases the heat that must be removed or accommodated as temperature increases. Pressures that can be used are also determined by equipment design and by safety concerns in the handling of TFE. Generally, pressures in the range of about 0.3–7 MPa are known for dispersion polymerization of TFE copolymers, and pressures in the range 0.7–3.5 MPa are common. While it is common to maintain constant pressure in the reactor, pressure can be varied.

After dispersion polymerization is complete and raw (as-polymerized) dispersion has been discharged from the reactor, traditional techniques known in the art (see U.S. Pat. No. 5,266,639, for example) can be used to recover TFE/PEVE copolymer solids from the aqueous polymerization medium. For example, such methods as coagulation by vigorous agitation, optionally with added electrolyte, or by freezing and thawing, followed by separation of the wet solids from the liquid and then by drying can be used.

The amorphous fluoropolymers of this invention are normally solid at 15°–20° C. and can have any molecular weight (MW) suitable for the intended use. Generally, the weight average MW is at least 25,000, preferably at least 50,000, and can range up to much higher values, such as 1,000,000 and even higher.

The amorphous TFE/PEVE copolymers of this invention can be used in many ways. Being amorphous, the resins and fabricated articles thereof are transparent and substantially free from haze, and can be particularly useful in applications for which optical clarity is important. In powder or pellet form, the copolymer resins can be used in any of the processes such as extrusion, molding, or pressing by which polymer resins are conventionally fabricated into finished articles, providing the properties of the copolymer are suitable for the intended use.

When made by aqueous dispersion polymerization, the TFE/PEVE copolymers of this invention can be used in dispersion form. The as-polymerized (raw) dispersion may be used as discharged from the reactor if it has adequate stability and/or wetting characteristics for the intended purpose. Alternatively, the raw dispersion can be adjusted by addition of surfactants, or concentrated and stabilized by techniques well known in the art. Other materials can be blended into the TFE/PEVE copolymer dispersions for use in dispersion form, or such blends can be co-coagulated as a step toward dry blends or filled resins. Small raw dispersion particle size (RDPS) typically obtained, e.g., 25–500 nm or more often 50–250 nm, contributes to stability with respect to settling and may make the dispersions particularly desirable for certain uses, such as impregnation and the formation of coherent films having small thickness. Dispersion concentrations can vary over a broad range, such as from about 10–40 wt % solids as obtained from polymerization to about 70 wt % solids when concentrated, based on combined weight of polymer solids and aqueous medium. The amorphous fluoropolymer of the present invention as an aqueous dispersion is another embodiment of the invention.

The amorphous TFE/PEVE copolymers of this invention can be in solution in fluorinated solvents. Illustrative solvents are disclosed, for example, by Tuminello & Cavanaugh in U.S. Pat. No. 5,328,946 and by Morgan et al. in U.S. Pat. No. 5,397,829. Other solvents that can be used include fluorinated trialkyl amines such as perfluoro (dibutylmethyl)amine and perfluoro(triamyl)amine. Solutions of the amorphous fluoropolymers of this invention in fluorinated solvents are another aspect of the invention. Perfluorinated compounds are preferred as solvents, but fluorinated compounds having up to about 12.5 atomic percent (at %) hydrogen and/or about 37.5 at % chlorine, based on total atoms bonded to carbon atoms, can be used. Generally, at least 50% of total atoms bonded to carbon atoms will be fluorine atoms. The concentration of polymer in the solutions of this invention can be at least 0.1 wt % and as much as 10 wt % and higher, 20 wt % and 30 wt %, depending on polymer and solvent, based on combined weight of polymer and solvent. Since solution viscosity increases with polymer concentration, lower concentrations, such as 0.5–5 wt %, are preferred for many purposes.

Dispersions and solutions of the amorphous fluoropolymers of this invention can be used according to any of the techniques by which such systems are known to be used, including casting, dipping, painting and spraying, making it possible to achieve end results that include any of the results for which polymer dispersions and solutions are used, such as coating, encapsulation, and impregnation. Normally, the dispersion or solution is deposited in place in the wet state, the deposit is dried, and the dried resin is fused or consolidated thermally.

The amorphous fluoropolymer of this invention can be used to make coatings on a broad range of substrate materials, including metal, semiconductor, glass, ceramics, refractory materials, dielectric materials, carbon or graphite, and natural and synthetic polymers including plastics and elastomers. The substrates can be in a broad range of physical forms, including film or paper, foil, sheet, slab, coupon, wafer, wire, fiber, filament, cylinder, sphere, and other geometrical shapes, as well as in a virtually unlimited number of irregular shapes. Coatings can be applied by methods known in the art, including dipping, spraying, and painting. For plane substrates of suitable dimensions, spin coating can be employed. Porous substrates, including those made from fluoropolymer such as polytetrafluoroethylene, can also be coated or impregnated. These include, for example, screens, foams, microporous membranes, and woven and non-woven fabrics.

EXAMPLE 1

TFE/PMVE/PEVE Copolymer

In a horizontal 1-gal (3.8-L) autoclave equipped with a paddle agitator, 2200 mL of demineralized water were deaerated by evacuation and purging with nitrogen. With the reactor at atmospheric pressure, 5 g of C-9 were added. The agitator was turned on at 100 rpm, the temperature was increased to 90° C., and the pressure was increased to 400 psig (2.86 MPa) by addition of a mixture of 27.2 wt % TFE, 51 wt % perfluoro(methyl vinyl ether) (PMVE), and 21.8 wt % PEVE. An initial charge of 30 mL of a 1.5 g/L solution of APS in water was added. At kickoff, as determined by a 10 psi (0.07 MPa) pressure drop, the same initiator solution was fed at the rate of 2 mL/min and a monomer mixture having the composition TFE/PMVE/PEVE=62/23/15 by weight was fed to maintain pressure at 400 psig. After about 600 g of monomer had been added after kickoff, all feeds were stopped. When the pressure dropped to 250 psig (1.83 MPa), the reactor was vented and the product dispersion was collected. Solids content of the dispersion was 22.3 wt %. The polymer was isolated by vigorously mixing the dispersion with approximately 40 mL of 70% nitric acid solution, and filtering with a filter cloth. The wet resin was rinsed with demineralized water three times with vigorous agitation, and dried at 80° C. under vacuum. The composition of the product resin was TFE/PMVE/PEVE=56.3/29.9/13.8 by weight as determined by $^{19}F$ NMR. No crystalline melting point was detected by DSC. The weight average molecular weight as measured by size exclusion chromatography (SEC) with universal calibration using on-line viscometry, using a Zorbax® silica column at 145° C., $C_{14}F_{24}$ as solvent, a flow rate of 0.2 mL/min and an evaporative light scattering detector, was 279,000.

Monomer Preparation 1

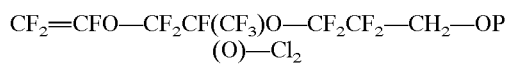

A pre-dried flask was charged with 9,9-dihydro-9-hydroxy-perfluoro-(3,6-dioxa-5-methyl-1-nonene) (EVE- OH, U.S. Pat. No. 5,059,720) (257 g, 0.652 mol), phosphoryl chloride (500 g, 3.257 mol) and anhydrous calcium chloride (3.6 g, 0.0324 mol). This reaction mixture was heated at 110° C. for 6–8 hr or until the EVE-OH starting material was consumed. The excess phosphoryl chloride was recovered by distillation at normal pressure. The residual liquid was then distilled under reduced pressure to give 1,1-dihydroperfluoro(4,7-dioxa-5-methyl-8-nonenyl) dichlorophosphate (EVE-P-chloride, formula above) product as a clear, colorless liquid having a boiling point of 85°–90° C. at 5 mmHg (or 67°–72° C. at 2 mmHg). Yield: 200 g (60%).

Monomer Preparation 2

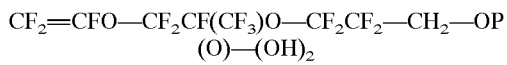

A round bottom flask was charged with 700 g (1.37 mol) of EVE-P-chloride and water (49.4 g, 2.75 mol) was slowly added. After all the water was added, the reaction mixture was stirred vigorously at ambient temperature overnight, then placed under high vacuum at 60° C. to remove any residual water and to give 9-phosphono-9,9-dihydroperfluoro(3,6-dioxa-5-methyl-1-nonene) (EVE-P, formula above) product as a clear, viscous liquid (640 g, 98.6% yield).

EXAMPLE 2

TFE/PMVE/PEVE/EVE-P Copolymer

The procedure of Example 1 was essentially followed, except that 15 mL of EVE-P were charged along with the C-9, the APS initiator solution concentration was 6.0 g/L, and the initiator solution pumping rate after kickoff was 3.25 mL/min. Solids content of the raw dispersion was 24.3 wt %. The product resin contained 54.0 wt % of TFE, 30.4 wt % of PMVE, and 15.6 wt % of PEVE and EVE-P combined, as determined by $^{19}F$ NMR. The amount of EVE-P in the copolymer was less than 1 wt %. No crystalline melting point was detected by DSC. The weight average molecular weight was 205,000.

EXAMPLE 3

TFE/PEVE Dipolymer

A cylindrical, horizonally disposed, water-jacketed, paddle-stirred, stainless steel reactor having a length to diameter ratio of about 1.5 and a water capacity of about 8.2 parts by weight was charged with 4.78 parts of demineralized water. After pressure-testing the reactor at 80° C. with 2.32 MPa nitrogen, the reactor was cooled to 30° C., alternately evacuated and purged with TFE three times, and then left under a vacuum. The vacuum was then used to draw into the reactor 0.275 part of a 7.76 wt % aqueous solution of Zonyl® TBS surfactant (DuPont). The solution was rinsed into the reactor with another 0.088 part of water. A valve to an ethane cylinder was then opened and ethane was fed to the reactor until the reactor pressure rose by 0.0203 MPa. After feeding 0.35 part of PEVE to the reactor, the reactor was sealed and agitation was begun at 100 rpm. The reactor temperature was raised to 80° C. and the reactor was pressured to 2.32 MPa with TFE. Then 0.055 part of a 1.24 wt % aqueous solution of APS was pumped into the reactor at 0.011 part/min. Thereafter, a 0.24 wt % aqueous solution of APS was pumped to the reactor at 0.0044 part/min for the remainder of the polymerization. After polymerization had begun, PEVE and TFE were added to the reactor at the respective rates of 0.0036 and 0.006 part/min for the remainder of the polymerization. The reactor pressure was maintained at 2.32 MPa by varying the agitator speed to control the mass transfer of the monomers from the gas phase into the aqueous dispersion. The average agitator speed during polymerization was 76.4 rpm. After 200 min, the TFE and PEVE feeds were stopped and full cooling was applied to the reactor. The agitator was turned off, the reactor was vented, and then the initiator addition was stopped. When the pressure had dropped to 1–2 psig (0.11–0.12 MPa), evacuation was stopped and nitrogen was added to the reactor to give a slow pressure rise. When the pressure reached 5 psig (0.14 MPa), the vacuum port was opened for one minute while maintaining the nitrogen purge. The dispersion, which was water-clear and quite stable, was then discharged from the reactor and saved. Solids content was 26.7 wt %.

A portion of the dispersion was poured into a plastic bottle and placed in a freezer at –20° C. overnight. The bottle of frozen dispersion was then thawed in a bucket of warm water and the polymer phase which had separated was collected on a filter. The polymer solids were washed three times with demineralized water and then dried at 50° C. in a vacuum oven for two days. PEVE content of the copolymer was determined to be 22.9 mol % (32.9 wt %) by $^{19}F$ NMR analysis of a 6 wt % solution in hexafluorobenzene at 80° C. The melt viscosity of the dried resin at 372° C. was found to be less than 30 Pa.s. DSC analysis showed no crystalline melting point, and a glass transition at about 13° C.

EXAMPLE 4

Solutions and Coatings

A 5 wt % solution, based on combined weight of polymer and solvent, of the TFE/PMVE/PEVE/EVE-P copolymer of Example 2 in highly fluorinated solvent that was predominanly perfluoro(dibutylmethyl)amine (Fluorinert® FC-40, 3M) was prepared. The solution was used to apply, by dip-coating, durable coatings on stainless steel, silicone rubber, nitrile rubber, ethylene/propylene/diene rubber, and fluoroelastomer substrates, as judged by tape pull testing and by rubbing with the tip of a cotton swab. Similar results were obtained when a silicone rubber substrate was coated with the aqueous dispersion as collected from the reactor in Example 2.

EXAMPLE 5

Solutions and Coatings

A 2 wt % solution of the TFE/PMVE/PEVE/EVE-P copolymer of Example 2 in FC-40 was prepared. This solution was used to apply, by spin-coating, durable coatings on copper and nickel substrates. Coating thicknesses were in the range of 1.0–1.5 μm.

EXAMPLE 6

The TFE/PEVE dipolymer of Example 3 was dissolved in Fluorinert® FC-75 (predominantly perfluorobutylfuran, 3M) to make a 10 wt % solution, based on the combined weight of resin and solvent, by agitating the resin in the solvent at about 100° C. for about 75 min. At 100° C., the viscosity of the solution appeared to be just slightly higher than that of the solvent alone, When cooled to room temperature, the solution became very viscous and poured slowly, but the polymer did not precipitate.

EXAMPLE 7 AND CONTROL A

Copolymer Comparisons

Procedures similar to that of Example 1 were followed to make four copolymers of TFE with PEVE and/or PMVE, using precharged and makeup monomer mixtures to achieve the desired compositions and using ethane as chain transfer agent to control molecular weight. All of the resultant copolymers were amorphous as evidenced by the absence of a crystalline melting endotherm by DSC. Polymer compositions, determined by Fourier transform infrared spectroscopy which had been calibrated by $^{19}F$ NMR, are shown in Table 1, along with glass transition temperatures ($T_g$) and various physical properties. Relative weight average molecular weight (MW) was determined by SEC calibrated with poly(hexafluoropropylene oxide) standards of known molecular weight. Tensile properties were measured according to ASTM method D-1708. The melt viscosity (MV) values shown in Table 1 were determined from data on shear stress as a function of shear rate at 175° C. over the shear rate range 5.86–3516 $sec^{-1}$, obtained using a Kayeness GALAXY V Rheometer. The MV for the dipolymers (Example 7-1 and Control A) were approximately the same over the entire shear rate range, despite Example 7.1 having lower MW. Nevertheless, the TFE/PEVE dipolymer of the invention exhibited substantially higher tensile strength, and even the lower-MV terpolymer of Example 7-3 had higher tensile strength than Control A. The two dipolymers were also tested for melt flow rate (MFR) under low shear stress (0.02 MPa) using the general method of ASTM D-1238 at 175° C. with a large orifice having diameter of 0.0825 inch (2.1 mm) and a 2160 g weight. Under this low shear stress, Example 7-1 did not flow while Control A had MFR of 2.50 g/10 min, leading to the conclusion that the PEVE copolymer of the present invention has higher activation energy of flow. This property, for example, would make the polymer of the invention less likely to sag ("curtain") under its own weight during application as a coating on a vertical surface.

TABLE 1

Compositions and Properties for Example 1 and Control A

| Composition & Properties | 7-1 | 7-2 | 7-3 | A |
|---|---|---|---|---|
| Composition (wt %): | | | | |
| TFE | 62.1 | 65.5 | 59.9 | 62.9 |
| PEVE | 37.9 | 16.0 | 23.1 | — |
| PMVE | — | 18.5 | 18.0 | 37.1 |
| Properties: | | | | |
| MW ($10^3$) | 145.1 | 483.1 | 195.2 | 269.2 |
| Tg (° C.) | 19 | 18 | 9 | 8 |
| Tensile strength (MPa) | 18.5 | 21.8 | 9.7 | 7.7 |
| Tensile modulus (MPa) | 136 | 30.2 | 6.3 | 6.0 |
| Tensile elongation (%) | 218 | 249 | 298 | 342 |
| MV ($10^3$ Pa · s) | | | | |
| at 10 $sec^{-1}$ | 6.7 | 22.0 | 2.8 | 6.7 |
| at 100 $sec^{-1}$ | 2.0 | 3.8 | 1.7 | 2.1 |
| at 1000 $sec^{-1}$ | 0.43 | 0.43 | 0.43 | 0.43 |

What is claimed is:

1. An amorphous fluoropolymer selected from the group consisting of (a) dipolymer of copolymerized units of tetrafluoroethylene and perfluoro(ethyl vinyl ether), and (b) copolymer of polymerized units of tetrafluoroethylene and perfluoro(ethyl vinyl ether) and at least one additional fluorinated monomer present in a minor amount relative to the amount of said perfluoro(ethyl vinyl ether), with the proviso that when said additional monomer is perfluoro (methyl vinyl ether), the amount of said perfluoro(methyl vinyl ether) can exceed the amount of perfluoro(ethyl vinyl ether) present, with the amount of perfluro(ethyl vinyl ether) being at least 15 wt % of the combined weight of said perfluoro(ethyl vinyl ether) and perfluoro(methyl vinyl ether).

2. The amorphous fluoropolymer of claim 1, comprising at least 20 wt % of perfluoro(ethyl vinyl ether).

3. An aqueous dispersion of the amorphous fluoropolymer of claim 1.

4. A solution of the amorphous fluoropolymer of claim 1 in a fluorinated solvent.

5. A coated article, comprising a substrate coated with a coating, wherein said coating comprises the amorphous fluoropolymer of claim 1.

6. The coated article of claim 4, wherein said substrate is woven or non-woven fabric.

7. The coated article of claim 4, wherein said substrate comprises metal.

8. The amorphous fluoropolymer of claim 1 wherein said fluoropolymer is said dipolymer.

9. The amorphous fluoropolymer of claim 1 wherein said fluoropolymer is said copolymer.

10. The amorphous copolymer of claim 9 wherein said additional monomer is a functional fluorinated monomer.

11. The amorphous copolymer of claim 9 wherein said additional monomer is perfluoro(methyl vinyl ether).

12. The amorphous copolymer of claim 1 wherein the amount of said additional monomer is less than 10 wt %.

13. The amorphous copolymer of claim 12 wherein the amount of said perfluoro(ethyl vinyl ether) is at least 20 wt %.

14. The amorphous copolymer of claim 11 wherein the amount of said perfluoro)ethyl vinyl ether) present is at least 25 wt % based on the combined weight of said perfluoro (ethyl vinyl ether) and said perfluoro(methyl vinyl ether).

* * * * *